United States Patent [19]

Buonomo et al.

[11] Patent Number: 4,814,977

[45] Date of Patent: Mar. 21, 1989

[54] APPARATUS AND METHOD FOR DIRECT MEMORY TO PERIPHERAL AND PERIPHERAL TO MEMORY DATA TRANSFERS

[75] Inventors: Joseph P. Buonomo; Raymond E. Losinger, both of Endicott; Burton L. Oliver, Nanticoke, all of N.Y.

[73] Assignee: S&C Electric Company, Chicago, Ill.

[21] Appl. No.: 925,488

[22] Filed: Oct. 29, 1986

Related U.S. Application Data

[63] Continuation of Ser. No. 852,606, Apr. 16, 1986, abandoned, which is a continuation of Ser. No. 542,935, Oct. 18, 1983, abandoned.

[51] Int. Cl.⁴ .................................. G06F 15/16
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,482,948 | 11/1984 | Holden | 364/200 |
| 4,038,642 | 7/1977 | Bouknecht et al. | 364/200 |
| 4,056,848 | 11/1977 | Gilley | 364/200 |
| 4,099,236 | 7/1978 | Goodman et al. | 364/200 |
| 4,122,520 | 10/1978 | Adamchick et al. | 364/200 |
| 4,128,876 | 12/1978 | Ames et al. | 364/200 |
| 4,245,300 | 1/1981 | Kaufman et al. | 364/200 |
| 4,249,240 | 2/1981 | Barnich | 364/200 |
| 4,270,167 | 5/1981 | Koehler et al. | 364/200 |
| 4,346,439 | 8/1982 | Huno et al. | 364/200 |
| 4,371,932 | 2/1983 | Dinwiddie, Jr. et al. | 364/200 |
| 4,400,772 | 8/1983 | Broyles et al. | 364/200 |
| 4,413,613 | 11/1968 | Bahrs et al. | 364/200 |
| 4,426,679 | 1/1984 | Yu et al. | 364/200 |
| 4,454,575 | 6/1984 | Bushaw et al. | 364/200 |
| 4,471,427 | 9/1984 | Harris | 364/200 |
| 4,475,155 | 10/1984 | Oishi et al. | 364/200 |
| 4,476,522 | 10/1984 | Bushaw et al. | 364/200 |
| 4,481,580 | 11/1984 | Martin et al. | 364/200 |
| 4,516,199 | 5/1985 | Frieder et al. | 364/200 |
| 4,543,627 | 9/1985 | Schwab | 364/200 |
| 4,547,849 | 10/1985 | Louie et al. | 364/200 |
| 4,589,067 | 5/1986 | Porter et al. | 364/200 |
| 4,590,556 | 5/1986 | Berger et al. | 364/200 |
| 4,591,982 | 5/1986 | Buonomo et al. | 364/200 |
| 4,598,356 | 7/1986 | Deom et al. | 364/200 |
| 4,648,034 | 3/1987 | Heninger | 364/200 |
| 4,677,433 | 6/1987 | Catlin et al. | 364/131 |
| 4,679,166 | 7/1987 | Berger et al. | 364/900 |
| 4,695,945 | 9/1987 | Irwin | 364/200 |

FOREIGN PATENT DOCUMENTS 0021365  1/1981  European Pat. Off.

OTHER PUBLICATIONS

C. Hastings, E. Gordon, R. Blasco, "Minimum Chip--Count Number Cruncher Uses Bipolar Co-Processor", WESCON Conference Record, vol. 25, Paper 3/1, Sep. 1981, pp. 1-7.

iAPX 86, 88 User's Manual, 8/81, pp. S-1 to S-9, (especially p. S-7).

Computer Design—Mar. 1981, pp. 178-182, "Floating Point Microprocessor Implemented as Optional Co--Processor".

Computer Design-Oct. 1979, pp. 182-186, "Floating Point Chip Performs 32- and 64-Bit Operations".

Primary Examiner—Gary V. Harkcom
Assistant Examiner—Christopher H. Lynt
Attorney, Agent, or Firm—James V. Lapacek

[57] ABSTRACT

A multi-microprocessor implemented data processing system having a single cycle data transfer capability for its memory mapped peripheral devices is described. A host or controlling microprocessor provides address and control signals for memory accesses. In addition, it also determines that a peripheral operation is desired. When this occurs, a command is sent to the selected peripheral and a memory cycle, fetch or store, for the data transfer is initiated. The address bus is provided with the memory address for the needed data and a special decode that indicates the unique nature of this memory access. Logic circuit means are provided to detect the special decode and to intercept the data bus at the appropriate point in the bus cycle in response thereto. The logic circuit means is adapted to then responsively apply the correct control signals to the peripheral to enable the desired data transfer after the data bus has been intercepted.

16 Claims, 4 Drawing Sheets

APPARATUS AND METHOD FOR DIRECT MEMORY TO PERIPHERAL AND PERIPHERAL TO MEMORY DATA TRANSFERS

This is a continuation of application Ser. No. 852,606, filed Apr. 16, 1986, now abandoned, which is a continuation of application Ser. No. 542,935, filed Oct. 18, 1983, now abandoned.

BACKGROUND OF THE INVENTION

1. Field of the Invention

This invention is concerned with data transfer in a multi-microprocessor implemented data processing system that emulates a mainframe system. More particularly, this invention is directed to optimizing the performance of such a system insofar as the transfer of data between main memory and peripheral devices is concerned.

2. Description of the Prior Art

The emulation of "mainframe" data processing systems through the use of microprocessors has become a reality. A typical main frame data processing system would be any one of the System/370 (S/370) models available from International Business Machines Corporation. The Personal Computer XT/370, a "desktop" System/370, also available from International Business Machines Corporation, is one example of such a microprocessor implemented main frame. This particular desktop system is a hardware/software package that allows one to run System/370 application programs in a single user environment, to run as a terminal attached to a main frame host or to run in a stand-alone mode as a personal computer, as required by the particular application. There are, of course, similar systems available from other manufacturers, all of which systems incorporate many of the same functions as the Personal Computer XT/370 although the manner and means of implementation does differ, in varying degrees, from system to system.

Due to revolutionary advances in chip densities and packaging, which have been accompanied by significant reductions in costs, many main frame features can now be implemented directly in a desktop system, while other features require some hardware and/or software assistance in order to make them available. The introduction and use of more powerful microprocessors such as, for example, the 8086 and 8088 from Intel Corporation and the 68000 from Motorola Corporation, added further to the list of functions it would be possible to implement in a desktop mainframe. This new breed of microprocessors is fully capable of running a large, enriched instruction set, such as that of System/370, although several of these microprocessors, working in concert with the aid of additional hardware and/or software support, would be required to effect instruction execution in an acceptable time period. It will also be appreciated that presently available microprocessors, while remarkable for the functions they do offer, are not capable of providing all mainframe capability without system compromise.

Thus, as in all data processing system designs, various trade-offs are made in order to optimize the price and performance of these microprocessor implemented desktop mainframes. One particular trade-off problem is posed by the need or desire to utilize certain mainframe functions and features that would be particularly difficult to provide in a microprocessor implemented desktop mainframe. Another type of trade-off problem is posed by the requirement that all architectural constraints of the emulated mainframe be adhered to so that user programs can be run without concern. One specific implementation problem of concern, due in part to such trade-offs being made, is that of optimizing the operation of data transfer to and from peripheral devices.

In a data processing system implemented with one or more microprocessors and including a plurality of peripheral devices, that data path between main memory and the peripheral devices represents a potential performance problem. The peripherals are "slave" devices, that is, they have no built-in intelligence or memory access capabilities. Commands and data must be transferred to and from a peripheral by the host microprocessor. In those systems where the peripheral is a memory mapped device, there is control logic between the host microprocessor and the peripherals as well. The control logic, among other functional responsibilities, decodes the address and control bus to determine if the host is transferring a command or data to or from a peripheral. If so, it then intercepts the bus and provides the proper control signals at the peripheral of interest to perform the data transfer. This means that data from memory must be first read by the host microprocessor into its internal storage area and then transferred to the peripheral. Similarly, results must be read from the peripheral into the internal storage area of the host microprocessor and then written into main memory therefrom. This operational data flow, via the host microprocessor's internal storage area, requires two host bus cycles to transfer one data element between main storage and a peripheral device.

In a microprocessor implemented mainframe, this data transfer approach will result in system performance degradation, particularly if the peripheral is a high usage device. Thus, while it would be possible to utilize standard data transfer arrangements and methodology in a microprocessor implemented mainframe data processing system, the performance penalties associated with that approach to the data handling are not acceptable.

OBJECTS AND SUMMARY OF THE INVENTION

Accordingly, it is a principal object of the present invention to provide means and a method that will permit a multi-microprocessor implemented mainframe data processing system to transfer data between main memory and a peripheral device in an optimized manner.

It is also a principal object of the present invention to provide such means and methodology in such a system that avoids the need to route data through the internal storage area of the microprocessor in control of the system in effecting data transfer between main memory and a peripheral device.

It is a further object of the present invention to provide means and a method for effecting such data transfers in only one bus cycle of the processor in control of the system.

These and other objects of the present invention are achieved in a multi-microprocessor implemented mainframe emulated data processing system by providing a single memory cycle data transfer capability for its memory mapped peripheral devices. The mircoprocessor in control provides address and control signals for memroy accesses. In addition, it also determines that a peripheral operation is desired. When this occurs, a command is sent to the selected peripheral and a memory cycle, fetch or store, for the data transfer is initiated. The address bus is provided with the memory address for the needed data and a special decode that indicates the unique nature of this memory access. Logic circuit means are provided to detect the special decode and to intercept the data bus at the appropriate point in the bus cycle in response thereto. The logic circuit means is adapted to then responsively apply the correct control signals to the peripheral to enable the desired data transfer after the data bus has been intercepted.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

The present invention is to be explained in the context of a mainframe desktop system that has been implemented with at least two microprocessors. More particularly, this resultant system has been adapted to emulate a System/370 mainframe. For those requiring further information on the instruction set of this mainframe and details of System/370 functions, reference should be made to the IBM System/370 Principles Of Operation (Manual No. GA22-7000), which is available from the IBM Corporation and which is, to the extent necessary, incorporated herein by reference. In addition, those requiring further information on the details of the desktop mainframe referred to herein should refer to Technical Reference Manual For The IBM Personal Computer XT/370 (Manual No. 6936732).

It will be understood by those having skill in this art that mainframe implementation can be achieved by use of only a single microprocessor. Alternatively, a plurality of microprocessors, equal to or different than the number used herein, could be employed to emulate a mainframe system. Further divergence in system configuration is possible as a result of variations in instruction set partitioning schemes and the manner in which the subsets are then emulated. Examples of this multiple microprocessor implementation approach are more completely described in commonly assigned U. S. patent application Ser. No. 371,634, filed in the names of Agnew et al on Apr. 26, 1982 now U.S. Pat. No. 4,514,803. In Agnew et al, a System/370 instruction set is partitioned in accordance with several criteria and the subsets thereof are each implemented on one or more of a plurality of microprocessors, but not all necessarily in the same manner.

Figure 1:
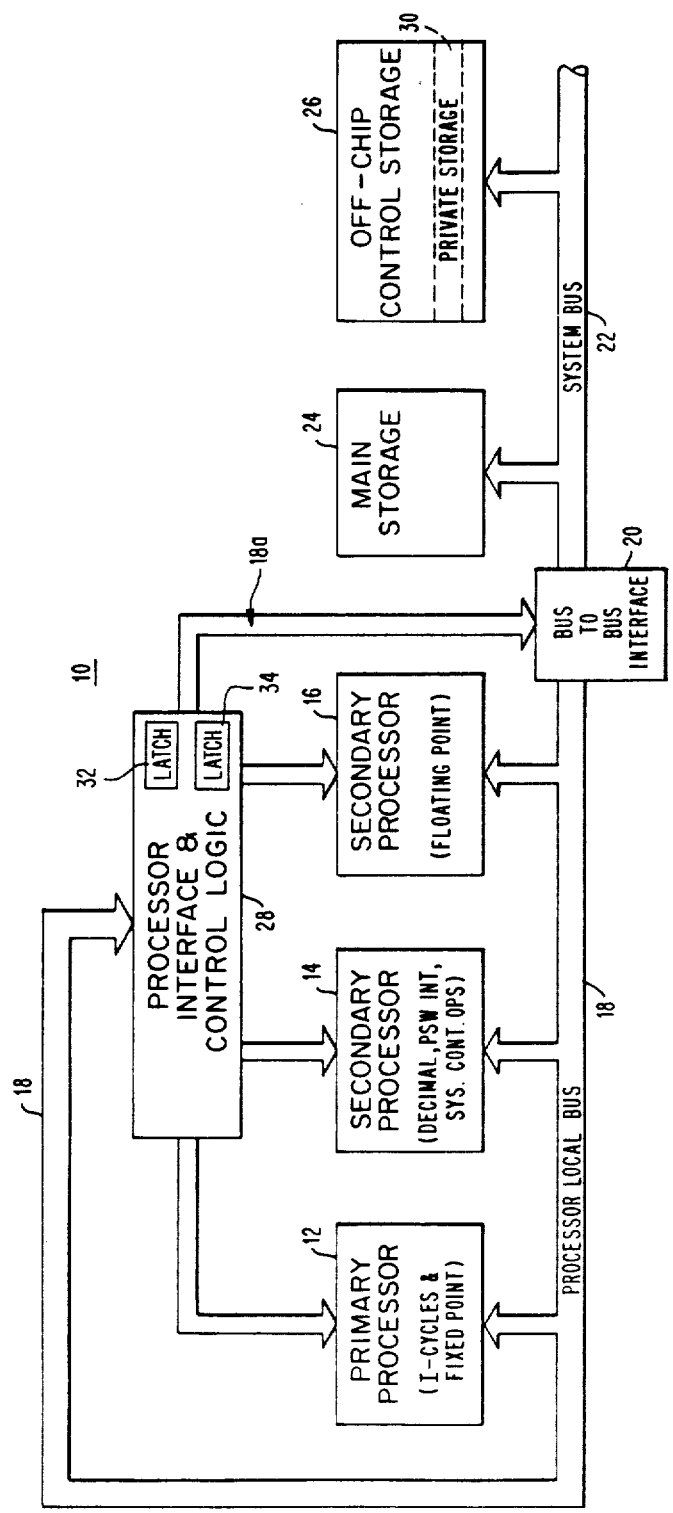
FIG. 1 schematically illustrates a simplified block diagram of a multi-microprocessor implemented mainframe data processing system which includes control and main memory storage.

An illustrative desktop mainframe data processing system 10 is shown in FIG. 1. As depicted in the simplified system block diagram thereof, a primary processing unit 12, and its associated secondary microprocessor 14 is connected to a local processor bus 18. A floating point peripheral chip 16, for example an Intel 80287, is also connected to the processor bus 18. Local bus 18 is connected, in turn, by bus-to-bus adapter 20 to the system bus 20. Main storage 24 and the secondary control storage 26 are both connected to the system bus 22. The primary processor 12, secondary processor 14 and the floating point peripheral 16 are also responsively connected to processor control logic means 28 which incorporates processor control and interface logic and some private storage therefor. Certain aspects of the control logic means 28 shall be discussed hereinafter in greater detail.

In the particular embodiment described herein, primary processor 12 is assigned the responsibility for performing all instruction fetches and operand address calculations for all of the processors used in the system. It also performs execution of all fixed point instructions, contains and maintains the general purpose registers, instruction length codes, condition codes and instruction addresses, recognizes system interrupts and provides indications to the system that a main storage instruction fetch or operand access is required. In addition, primary processor 12 is also able to provide an indication to the system that a change in processor control is needed.

Secondary processor 14 performs execution of all system control instructions and maintains all of the control registers. When necessary, it performs the service processor function and provides indications to the system of main storage operand access and private storage microcode access. In addition, secondary microprocessor 14 is able to provide the system with an indication that a change in processor control is needed.

Floating point peripheral chip 16 performs execution of all floating point instructions, containing and maintaining all of the floating point registers. It also provides the system with an indication of main storage operand access and of a need to alter microprocessor control. Alternatively, these floating point functions can be provided by a microprocessor rather than by a peripheral unit.

The mainframe instruction set is thus allocated for execution among the several processors. Primary processor 12 is provided with limited on-chip control store that can be utilized to store mainframe instruction responsive microcode and/or microprocessor interface and control microcode. It will be recognized, given the fixed quantity of on-chip control store available, that the instruction responsive microcode and the interface microcode reside in control store at the cost of the other. A greater amount of one type of microcode in on-chip control store residence means that a lesser amount of the other type can be accommodated therein. If a more functional microprocessor interface is desired, with an attendant cost in supporting microcode, there will be less room in control store for instruction responsive microcode. From a performance standpoint, it is best to keep the interface simple and leave as much control store as possible for instruction code. The present invention facilitates and makes this possible. In this embodiment, for example, it has been decided to place microcode for the most frequently used mainframe instructions in the control store of microprocessor 12 and to use a relatively simple intermicroprocessor interface that requires minimal microcode.

A main storage module 24 is attached to system bus 22, which is also referred to as a data bus 22. The system bus 22 is used as needed by processors 12 and 14. It is assumed that the processor local bus 18 and microprocessors 12 and 14 all include 24 bits of addressing to accommodate the addressing structure of the mainframe to be implemented. It may be necessary to slightly modify currently available microprocessors to achieve this addressing capability. The secondary processor 14 uses off-chip control storage moduled 26, as may be necessary, for its own microcode and scratchpad functions. Processors 12 and 14, floating point peripheral 16 and processor control logic means 28 are interconnected together by and pass information to each other on the processor local bus 18. The microcode required by primary processor 12 and resident in its on-chip control store, including the microcode for primary processor memory accesses and related instruction decoding and execution, can be found in commonly assigned and copending U.S. application Ser. No. 527,053 filed in the name of J. P. Buonomo et al, now U.S. Pat. No. 4,591,982, and is incorporated herein by reference to the extent necessary. The microcode required by secondary microprocessor 14 is shown in source form in Appendix A of U.S. Pat. No. 4,591,982.

Because all of the available address bits or lines in a microprocessor implemented mainframe will be needed to define and emulate the mainframe's virtual storage, it would not be effective to divide all possible storage defined by the available address bits between virtual main storage and control storage. Since all of the available address lines are needed to define virtual storage, prior to calculation of the real address involved, there is no direct manner of using those same address lines to also identify unique control storge addresses. An additional address line is required and implemented to distinguish main storage from control storage accesses.

Although shown as two separate modules, and they are from a logical standpoint, main storage and control storage are a physically contiguous block of random access memory (RAM), with an exception to be discussed below. The dividing line between storage modules, as described herein, is the dividing line between real main storage and control storage. In this illustrative embodiment, the main storage module 24 runs from address 00000 to address 77FFF (hexidecimal—hereinafter hex). The control storage module 26 runs from address 78000 to address 7FFFF (hex). The addresses used herein have been selected to simplify and facilitate this description. Those having skill in this art will recognize that the address limits for each memory module are a design choice and that the manipulation of more than one address bit, to steer between main and control storage, may be necessary.

Private store 30, referred to previously, is logically a portion of off-chip control storage 26, but is physically located in the processor control logic means 28 and mapped into a reserved segment of control store 26. The reserved segment of control store 26 is typically about 256 bytes long, although it can be greater. Private store 30 includes one unique memory mapped address for each peripheral connected to the system bus. An access of any one of these peripheral addresses will invoke a bus cycle alteration in accordance with the present invention as shall be explained below.

The processor control logic means 28 is connected to bus-to-bus interface 20 via bus feeder 18a. Also physically located in the processor control logic means 28 are a pair of override latches 32 and 34 that serve to steer memory accesses from processors 12 and 14 to either the main memory storage module 24 or to the off-chip control storage module 26, as is explained in greater detail in commonly assigned U.S. patent application No. 527,053 now U.S. Pat. No. 4,591,982.

Figure 2C:
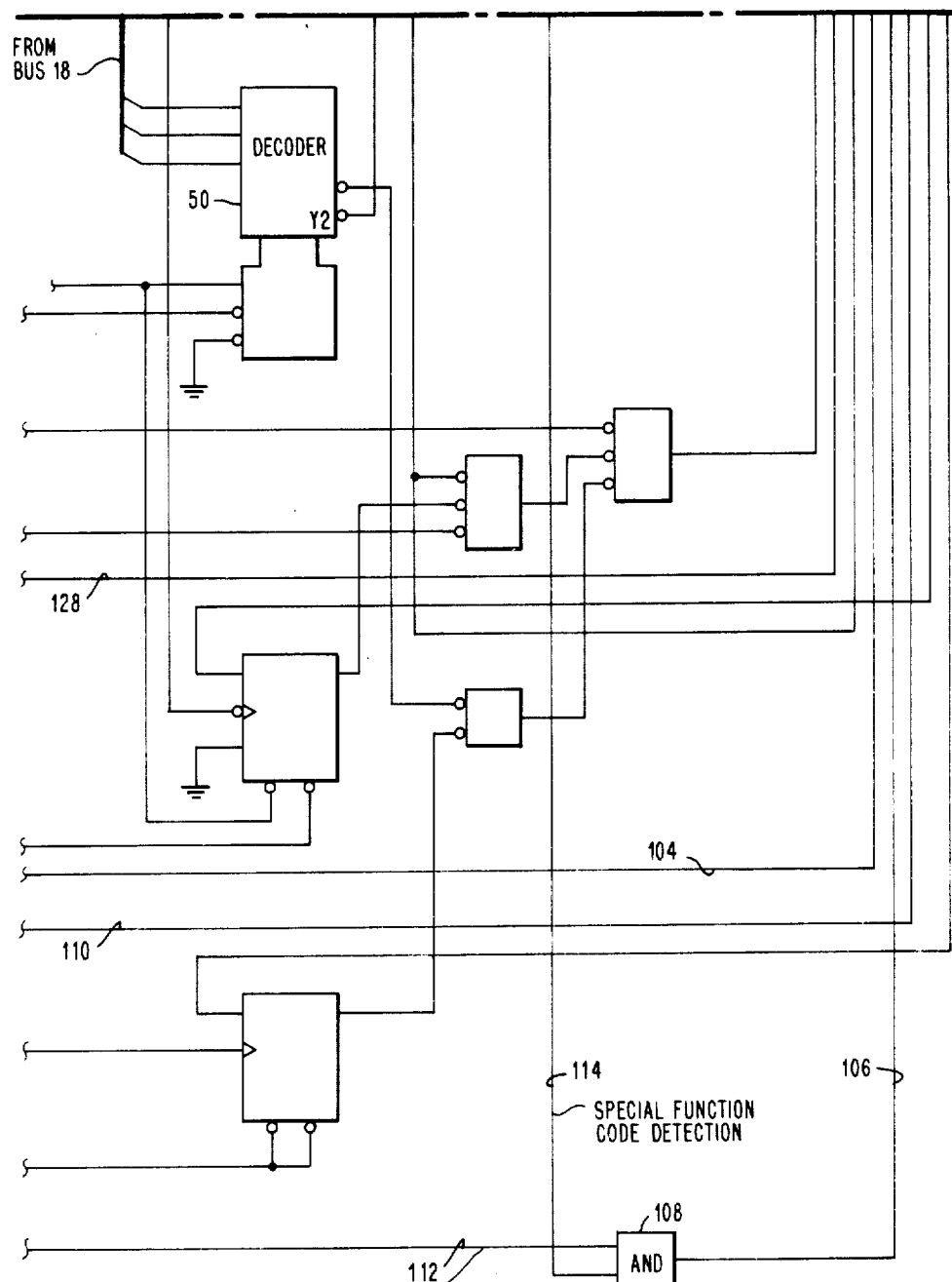
FIG. 2 schematically depicts, in greater detail and in accordance with the present invention, memory to peripheral and peripheral to memory data transfer means used in the FIG. 1 apparatus FIG. 2 being subdivided into FIGS. 2A, 2B, and 2C as indicated in FIG. 2.
Figure 2:
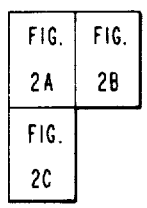
Figure 2A:
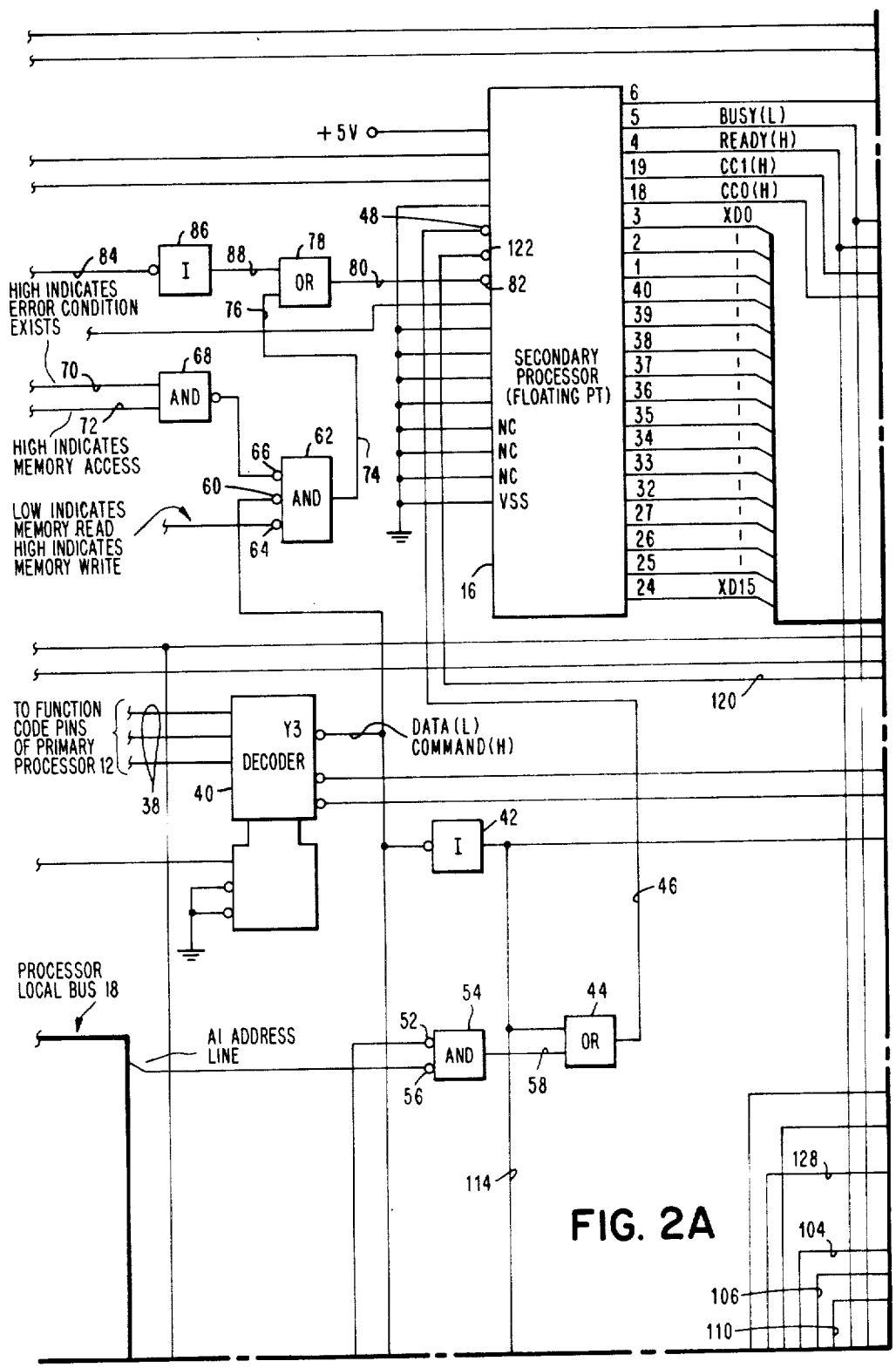
Figure 2B:
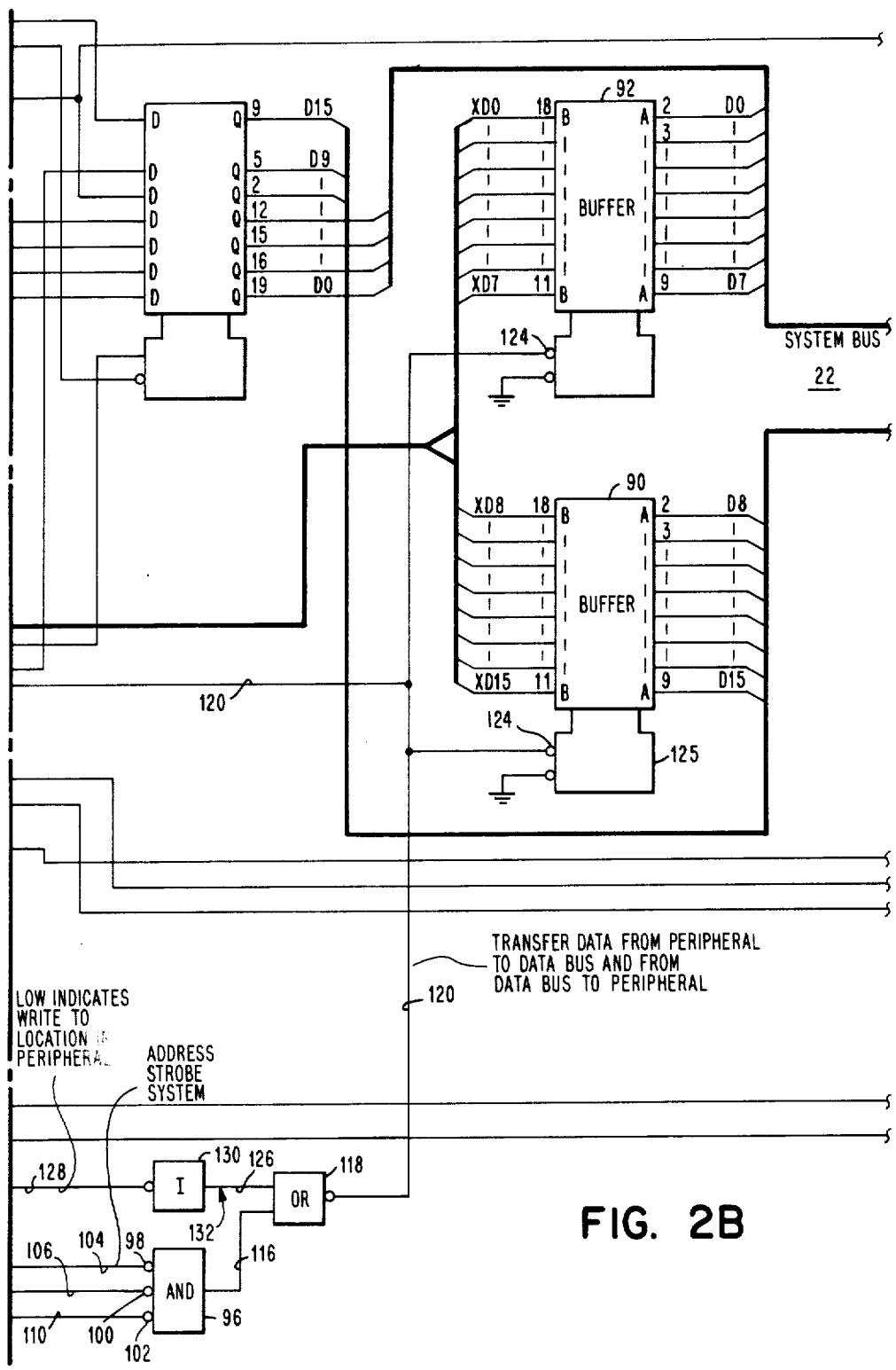

Data transfer to and from the memory mapped peripherals of the present system is handled in accordance with the apparatus shown in FIGS. 2A, 2B, and 2C, which together constitute FIG. 2 and via the methodology explained hereinafter. The FIG. 2 apparatus is invoked after primary microprocessor 12 has received and decoded an instruction requiring use of a peripheral. This approach to data transfer contemplates that a peripheral to be serviced can be tightly coupled to the data bus and appropriately conditioned to timely write data to or read data from bus 18 without intermediate storage in the primary processor. For purposes of this description, that peripheral is assumed to be the floating point chip 16. In order to facilitate understanding of the FIG. 2 apparatus, the normal status of a logic signal will be parenthetically indicated near the line carrying a particular signal. A logically low signal will be indicated as (L) and a logically high signal will be indicated as (H).

When a floating point instruction is encountered by primary processor 12, it initiates action to utilize that peripheral. Primary processor 12 performs the first step in that procedure by forwarding a command to the peripheral. Since all peripherals in the present system are memory mapped, primary processor sends a command appropriate to the decoded instruction being executed by attempting to "write" the appropriate command to the predetermined memory mapped location associated with peripheral 16, in this instance an address in the 5F2X (hex) range. Depending upon the nature of the floating point instruction being executed, primary processor 12 will either send a "write" or a "read" command to peripheral 16. In addition, when execution of the floating point or any other distinctive instruction requiring its data directly from main memory begins, a special decode or function code is responsively placed on certain of the primary processor's output pins to signify that this instruction is one that will be taking its data directly from or sending it directly to main memory 24.

For purposes of clarity, it should be understood that if any peripheral requires data, that data is written to the peripheral by first reading it from memory. Thus, if peripheral 16 needs data, it must be conditioned to have that data written to it. Similarly, if peripheral 16 has finished manipulating data, the results are read from the peripheral and then written to memory. It will first be assumed that the instruction being executed requires peripheral 16 to perform an operation that will need data from main memory.

In response to such an instruction, primary processor 12 writes a "write" command to peripheral 16 and thereby to its associated memory mapped address, in this instance an address in the 5F2X (hex) range. The "X" signifies that the address can be completed by any hexidecimal value. At the same time, the function code output pins of primary processor 12 and signal lines 38 connected thereto are conditioned to logically reflect the nature of the particular instruction being executed. The function code is read by decoder 40 which responsively sets its Y3 output to a logical high whenever a floating point command is detected. This logical high signal is inverted by inverter 42 and applied to one input of OR gate 44. Thus, a function code indication of a command holds one input to OR gate 44 at a logical low.

The writing of a command to the memory mapped address associated with peripheral 16 causes that address to be placed on bus 18 from where it is received and detected by address decoder 50. Its Y2 output is set to a logical low whenever a write to the 5F2X (hex) address block is detected. That decoder 50 output is connected to the inverted input 52 of AND gate 54. Thus, whenever an access is attempted to the predetermined block of memory mapped locations associated with the system peripherals, input 52 of AND gate 54 is set to a logical high.

The other input 56 of AND gate 54 is connected directly to the A1 address line of bus 18, the penultimate least significant bit thereof. This address line is used, as shall be explained, to provide a toggle between command and data. When A1 is logically low, the input 56 of AND gate 54 is set logically high. Thus, whenever address bit A1 is at a logical low, input 56 of AND gate 54 is set to a logical high. It will be observed that AND gate 54 is enabled, its output line 58 is set to a logical high, only when a memory mapped peripheral address is accessed and address bit A1 is logically low. Under any other set of input conditions, output line 58 will be set at a logical low.

When output line 58 is at a logical high, OR gate 44 will be enabled. As previously described, when the appropriate function code is detected, the other input line to OR gate 44 will be set to a logical high. Thus, a logical high at either input of gate 44 will set its output to a logical high. However, both input lines of OR gate 44 must be at a logical low to force its output to a logical low. The output 46 of OR gate 44 is connected to the command/data input pin 48 of floating point peripheral 16. When command/data pin 48 is set to a logical high, it causes peripheral 16 to be conditioned to accept or transfer data. When command/data pin 48 is set to a logical low, it causes peripheral 16 to look for command advice.

Having now conditioned peripheral 16 to accept a command, the next step is to advise the peripheral of the nature of the command. In the case of a "write", where data is to be read from memory and written to peripheral 16, the control logic responds as follows. Detection of the appropriate function code caused by the primary processor 12 writing an appropriate command to 5F2X also sets the inverted input 60 of AND gate 62 to a logical high. Inverted input 64 of AND gate 62 is set to a logical low for a memory read, required for a peripheral "write", and to a logical high for a memory write, required to "read" from the peripheral.

The remaining inverted input 66 to AND gate 62 is conditioned by AND gate 68. When both inputs are set to a logical high, AND gate 68 is enabled causing its inverted output to be set to a logical low. This causes inverted input 66 of AND gate 62 to be set to a logical high. Input 70 of AND gate 68 is set high to indicate that no error condition exists. Input 72 of AND gate 68 is set high to indicate that a System/370 memory access is to take place. When both of these conditions are satisfied, the output of AND gate 68 is enabled and then inverted to a logical low.

When all of its inputs are inverted to logical highs, AND gate 62 has its output line 74 set to a logical high. This puts input 76 of the floating point write OR gate 78 at a logical high. When input 76 of OR gate 78 is set to a logical high, its output 80 is enabled and inverted thereby to a logical low. This sets the write command pin 82 of floating point peripheral 16 and conditions it to accept the data it will need to perform its floating point function.

The other input to OR gate 78 is also derived from a write to the memory mapped address associated with the floating point peripheral 16. It is provided for those instances where peripheral usage is required without invocation of a direct, single bus cycle peripheral from memory data transfer. When a write to that memory location is made, line 84 is set low. This signal is inverted by inverter 86 to a logical high whenever peripheral 16 is not busy. With output 88 of inverter set to a logical high, the other input to floating point write enable OR gate 78 is set to a logical high. When input 88 of OR gate 78 is set to a logical high, its output 80 is enabled and set thereby to a logical low by inversion. This sets the write command pin 82 of floating point peripheral 16 and conditions it to accept the data it will need to perform its floating point function.

Having now been commanded to accept data, peripheral 16 signals that it is ready by raising its ready line as described in commonly assigned and copending U.S. patent application Ser. No. 542,934. This will eventually permit the start of a new bus cycle whereupon the primary processor will read the data needed by the peripheral 16 onto the data bus 22 from main memory 24. When that occurs, the data is forwarded to peripheral 16 by the bi-directional buffers 90 and 92, which are connected to the data bus. Buffers 90 and 92 are normally conditioned to pass data, in this embodiment, toward the peripheral being accessed.

Prior to a data read from main memory 24 and the appearance of data on the data bus 22, primary processor 12 sets address A1 bit to a logical high. This causes input 58 to OR gate 44 to be set to a logical low. At the same time, the function code changes to indicate a data and not a command write, which brings output Y3 of decoder 40 to a logical high. This also sets the other input of OR gate 44 to a logical low. With both inputs low, inverter 44 has its output held low and the command/data input pin 48 of peripheral 16 is set low, thereby indicating data is to be transferred. This conditions peripheral 16 to have the data written to it directly from the bus and bidirectional buffers 90 and 92 without it first having to be read into and out of the internal registers of primary processor 12.

A peripheral read, when manipulated data is to transferred from the accessed peripheral to memory is command conditioned in the same manner as was the peripheral write. Once the peripheral has been advised that it should expect a command by appropriately setting its input pin 48, primary processor 12 then initiates a peripheral "read" operation as follows. AND gate 96 is provided with three inverted inputs 98, 100 and 102. Input 98 is connected by signal line to receive an address strobe signal that is active low. Input 100 is connected to receive the inverted output 106 of AND gate 108. Input 102 is connected to reflect the type of main memory access to be performed by signal line 110.

The inputs 112 and 114 to AND gate 108 respectively reflect an address boundary error condition and a special function code detection from the output of inverter 42. Without said error and when the proper function code has been detected, AND gate 108 will be enabled setting its output to a logical low and input pin 100 of AND gate 96 to a logical high. Similarly, a main memory write sets signal line 110 logically low and input 102 to a logical high. When the proper address strobe, active low, is received, AND gate 96 is enabled setting its output to a logical high.

This sets input 116 to floating point read enable OR gate 118 to a logical high and enables gate 118. When enabled, gate 118 has its output 120 set by inversion to a logical low. Output 120 of read enable gate 118 is connected to the read pin 122 of peripheral 16. When set low, this pin conditions the peripheral to have data read therefrom. Output 120 of read enable gate 118 is also connected to the directional control pins 124 of the bidirectional buffers 90 and 91. When set low, these pins force the buffers to transfer data from the peripheral to the data bus 22. When a peripheral "read" is not required, output 120 will be at a logical low which sets directional control pins 124 of buffers 90 and 92 to transfer data from bus 22 to the peripheral.

The other input 126 to OR gate 118 is also derived from a write to the memory mapped address associated with the floating point peripheral 16. It is provided for those instances where peripheral usage is required without invocation of a direct, single bus cycle peripheral to memory data transfer. When a write to that memory location is made, line 128 is set low. This signal is inverted by inverter 130 to a logical high whenever peripheral 16 is not busy. With output 132 of inverter 130 set to a logical high, input 126 to floating point write enable OR gate 118 is set to a logical high. When input 126 of OR gate 118 is set to a logical high, its output 120 is enabled and inverted thereby to a logical low. This sets the write command pin 122 of floating point peripheral 16 and conditions it to accept the data it will need to perform its floating point function.

The implementation just described assumes that there are sufficient memory decodes available at the primary processor 12 to address all of memory and signal the special decode or function codes for a single bus cycle data transfer. It there are not enough memory decodes available, additional control circuit logic can be provided to engraft that function onto a recognition that a main memory data transaction is to be performed.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. A multiprocessor system comprising:
   a bus;
   a memory connected to said bus;
   a peripheral device connected to said bus;
   a primary processor connected to said bus, said primary processor including an internal store, said primary processor outputting a plurality of function code signals; and
   control means connected to said bus for outputting a plurality of conditioning signals in response to said function code signals, said conditioning signals controlling the execution and direction of a direct data transfer between said peripheral device and said memory without intermediate storage of said data in said internal store of said primary processor, said direct data transfer executed in response to said conditioning signals, said bus tightly coupled to said peripheral device during said direct data transfer;
   said control means further comprising a function code signal decoder means, an address decocer means, and a write gate means;
   said function code signal decoder means producing as an output a conditioning signal in response to said function code signals indicating when said primary processor is issuing a command or transferring data;
   said address decoder means producing as an output a conditioning signal when said primary processor is addressing said peripheral device;
   said conditioning signals produced as the output of said function code signal decoder means and the output of said address decoder means together enable the selection of said peripheral device for a read or write operation between said peripheral device and said memory;
   said write gate means producing a conditioning signal in response to an output of write signals from said primary processor and an output of said function code decoder means indicating read or write status to said peripheral device.

2. The system of claim 1 wherein said conditioning signals include a first conditioning signal and a second conditioning signal outputted in response to a first function code signal and a said second funtion code signal respectively, a first state of said first conditioning signal conditioning said peripheral device for a direct data transfer and a second state of said first conditioning signal conditioning said peripheral device for no direct data transfer, a first state of said second conditioning signal conditioning said peripheral device to accept data from said memory and a second state of said second conditioning signal conditioning said peripheral device to transfer data to said memory.

3. The system of claim 2 further comprising:
   a plurality of bidirectional buffers connected to said bus, said buffers intermediately storing said data during said direct data transfer, said conditioning signals including a third conditioning signal outputted in response to a third function code signal, said third conditioning signal controlling the direction of data transfer through said buffers, a first state of said third conditioning signal conditioning said buffers to transfer data from said memory to said peripheral device and a second state of said third conditioning signal conditioning said buffers to transfer data from said peripheral device to said memory.

4. The system of claim 1 wherein said peripheral device is emulated by a coprocessor.

5. A multiprocessor system comprising:
   a bus;
   an actual memory connected to said bus;
   a peripheral device connected to said bus;
   a primary processor connected to said bus, said primary processor including an internal store, said primary processor outputting a plurality of function code signals; and control means connected to said bus for outputting a plurality of conditioning signals in response to said function code signals, said conditioning signals controlling the execution and direction of a direct data transfer between said peripheral device and said actual memory without intermediate storage of said data in said internal store of said primary processor, said direct data transfer executed in response to said conditioning signals, said primary processor addressing said actual memory during said direct data transfer;

said control means further comprising a function code signal decoder means, an address decoder means, and a write gate means;

said function code signal decoder means producing as an output a conditioning signal in response to said function code signals indicating when said primary processor is issuing a command or transferring data;

said address decoder means producing as an output a conditioning signal when said primary processor is addressing said peripheral device;

said conditioning signals produced as the output of said function code signal decoder means and the output of said address decoder means together enable the selection of said peripheral device for a read or write operation between said peripheral device and said memory;

said write gate means producing a conditioning signal in response to an output of write signals from said primary processor and an output of said function code decoder means indicating read or write status to said peripheral device.

6. The system of claim 5 wherein said conditioning signals include a first conditioning signal and a second conditioning signal outputted in response to a first function code signal and a said second function code signal respectively, a first state of said first conditioning signal conditioning said peripheral device for a direct data transfer and a second state of said first conditioning signal conditioning said peripheral device for no direct data transfer, a first state of said second conditioning signal conditioning said peripheral device to accept data from said actual memory and a second state of said second conditioning signal conditioning said peripheral device to transfer data to said actual memory.

7. The system of claim 6 further comprising:
a plurality of bidirectional buffers connected to said bus, said buffers intermediately storing said data during said direct data transfer, said conditioning signals including a third conditioning signal outputted in response to said function code signals, said third conditioning signal controlling the direction of data transfer through said buffers, a first state of said third conditioning signal conditioning said buffers to transfer data from said actual memory to said peripheral device and a second state of said third conditioning signal conditioning said buffers to transfer data from said peripheral device to said actual memory.

8. The system of claim 5 wherein said peripheral device is emulated by a coprocessor.

9. A method for transferring data in a multiprocessor system, said multiprocessor system including a bus, a memory connected to said bus, a peripheral device connected to said bus, a primary processor connected to said bus and including an internal store, and a control means connected to said bus, said control means further comprising a function code signal decoder means, an address decoder means, and a write gate means, said method comprising the steps of:

outputting a plurality of function code signals from said primary processor;

outputting a plurality of conditioning signals from said control means in response to said function code signals, said conditioning signals controlling the execution and direction of a direct data transfer between said peripheral device and said memory without intermediate storage of said data in said internal store of said primary processor;

producing a conditioning signal from said function code signal decoder means in response to said function code signals from said primary processor indicating when said primary processor is issuing a command or transferring data;

producing a conditioning signal from said address decoder means when said primary processor is addressing said peripheral device;

selecting said peripheral device for a read or write operation between said peripheral device and said memory under control of said conditioning signals produced by said function code signal decoder means and said address decoder means;

producing a conditioning signal from said write gate means in response to the output of write signals from said primary processor and the output of said function code signal decoder means indicating read or write status to said peripheral device;

directly transferring data between said peripheral device and said memory in response to said conditioning signals without intermediate storage of said data in said internal store of said primary processor; and maintaining said bus tightly coupled with said peripheral device during said direct transfer of data.

10. The method of claim 9 wherein said outputting of conditioning signals includes outputting a first conditioning signal and a second conditioning signal from said control means in response to a first function code signal and a second function code signal respectively, a first state of said first conditioning signal conditioning said peripheral device for a direct data transfer and a second state of said first conditioning signal conditioning said peripheral device for no direct data transfer, a first state of said second conditioning signal conditioning said peripheral device to accept data from said memory and a second state of said conditioning signal conditioning said peripheral device to transfer data to said memory.

11. The method of claim 10 further including a plurality of bidirectional buffers connected to said bus, wherein said outputting of conditioning signals includes outputting a third conditioning signal from said control means in response to a third function code signal, said buffers intermediately storing said data during said direct data transfer, said third conditioning signal controlling the direction of data transfer through said buffers, said buffers intermediately storing said data during said direct transfer of data, a first state of said third conditioning signal conditioning said buffers to transfer data from said memory to said peripheral device and a second state of said third conditioning signal conditioning said buffers to transfer data from said peripheral device to said memory.

12. The method of claim 9 wherein said peripheral device is emulated by a coprocessor.

13. A method for transferring data in a multiprocessor system, said multiprocessor system including a bus, an actual memory connected to said bus, a peripheral device connected to said bus, a primary processor connected to said bus and including an internal store, and a control means connected to said bus, said control means further comprising a function code signal decoder means, an address decoder means, and a write gate means, said method comprising the steps of:

outputting a plurality of function code signals from said primary processor;

outputting a plurality of conditioning signals from said control means in response to said function code signals, said conditioning signals controlling the execution and direction of a direct data transfer between said peripheral device and said actual memory without intermediate storage of said data in said internal store of said primary processor;

producing a conditioning signal from said function code signal decoder means in response to said function code signals from said primary processor indicating when said primary processor is issuing a command or transferring data;

producing a conditioning signal from said address decoder means when said primary processor is addressing said peripheral device;

selecting said peripheral device for a read or write operation between said peripheral device and said memory under control of said conditioning signals produced by said function code signal decoder means and said address decoder means;

producing a conditioning signal from said write gate means in response to an output of write signals from said primary processor and the output of said function code signal decoder means indicating read or write status to said peripheral device;

directly transferring data between said peripheral device and said actual memory in response to said conditioning signals without intermediate storage of said data in said internal store of said primary processor; and addressing said actual memory by said primary processor during said direct transferring of data.

14. The method of claim 13 wherein said outputting of conditioning signals includes outputting a first conditioning signal and a second conditioning signal in response to a first function code signal and a second function code signal respectively, a first state of said first conditioning signal conditioning said peripheral device for a direct data transfer and a second state of said first conditioning signal conditioning said peripheral device for no direct data transfer, a first state of said second conditioning signal conditioning said peripheral device to accept data from said actual memory and a second state of said second conditioning signal conditioning said peripheral device to transfer data to said actual memory.

15. The method of claim 14 further including a plurality of bidirectional buffers connected to said bus, wherein said outputting of conditioning signals includes outputting a third conditioning signal from said control means in response to a third function code signal, said buffers intermediately storing said data during said direct data transfer, said third conditioning signal controlling the direction of data transfer through said buffers, said buffers intermediately storing said data during said direct transfer of data, a first state of said third conditioning signal conditioning said buffers to transfer data from said actual memory to said peripheral device and a second state of said third conditioning signal conditioning said buffers to transfer data from said peripheral device to said actual memory.

16. The method of claim 13 wherein said peripheral device is emulated by a coprocessor.

* * * * *

UNITED STATES PATENT AND TRADEMARK OFFICE
CERTIFICATE OF CORRECTION

PATENT NO. : 4,814,977

DATED : March 21, 1989

INVENTOR(S) : Joseph P. Buonomo; Raymond E. Losinger, Burton L. Oliver

It is certified that error appears in the above-identified patent and that said Letters Patent is hereby corrected as shown below:

Front Page:

Assignee: Delete "S&C Electric Company, Chicago, Ill." and substitute therefor --International Business Machines Corporation, Armonk, New York--.

Attorney, Agent or Firm    Delete "James V. Lapacek" and substitute therefor --John C. Smith, Maurice H. Klitzman, and Manny W. Schecter--.

Col. 10, line 10    Delete "decocer" and substitute therefor --decoder--.

Col. 10, line 35    Delete "funtion" and substitute therefor --function--

Signed and Sealed this

Eighth Day of May, 1990

Attest:

HARRY F. MANBECK, JR.

*Attesting Officer*    Commissioner of Patents and Trademarks